(No Model.)

R. N. GARRETT.
TIRE TIGHTENER.

No. 575,230. Patented Jan. 12, 1897.

WITNESSES:

INVENTOR
R. N. Garrett
BY
ATTORNEYS.

THE NORRIS PETERS CO., PHOTO-LITHO., WASHINGTON, D. C.

UNITED STATES PATENT OFFICE.

ROBERT N. GARRETT, OF TROY, TEXAS.

TIRE-TIGHTENER.

SPECIFICATION forming part of Letters Patent No. 575,230, dated January 12, 1897.

Application filed September 22, 1896. Serial No. 606,656. (No model.)

*To all whom it may concern:*

Be it known that I, ROBERT N. GARRETT, of Troy, in the county of Bell and State of Texas, have invented a new and Improved Tire-Tightener, of which the following is a full, clear, and exact description.

My invention relates to devices for tightening the tires on new wheels, as well as wheels that have been in use, and upon which the tires have become loosened, and the object of the invention is to provide a tightener which will be exceedingly simple, durable, and economic, and wherein the tightener may be expeditiously and conveniently applied without altering the shape of the felly and at the same time maintain a true circular shape for the tire.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
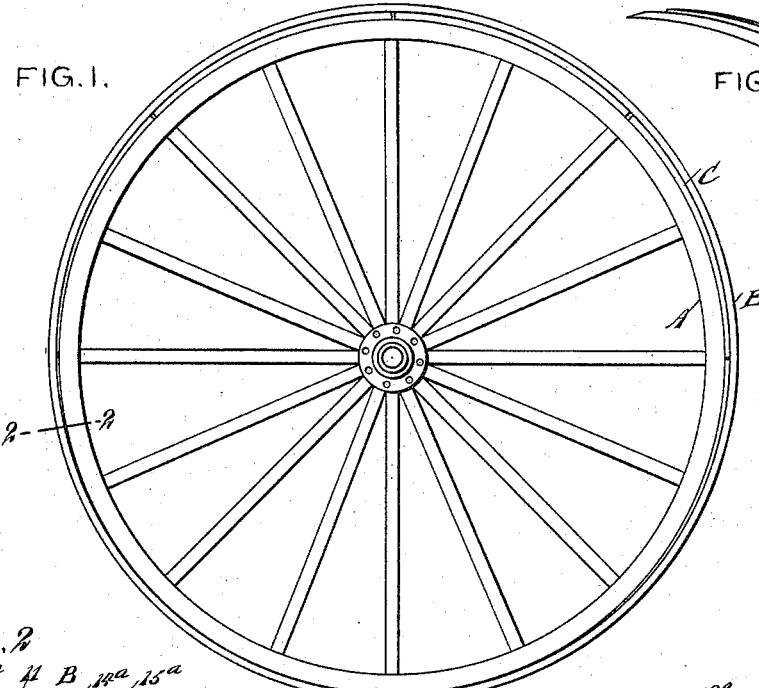
Figure 5:
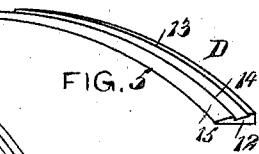
Figure 2:
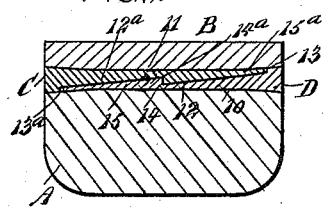
Figure 4:
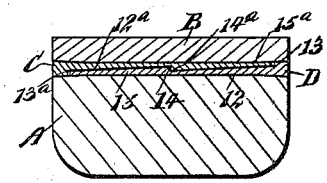
Figure 3:
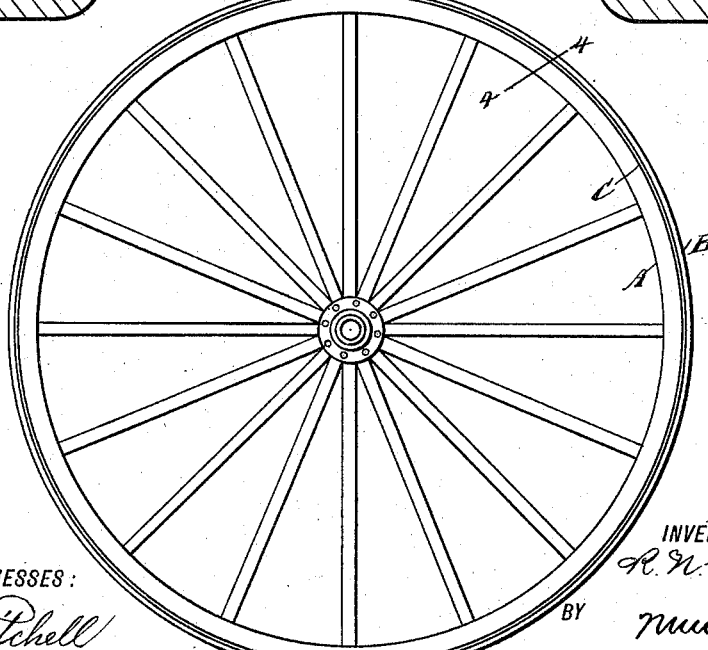

Figure 1 is a side elevation of a wheel upon which the tire has become loosened, illustrating the application of the device thereto. Fig. 2 is a transverse section taken substantially on the line 2 2 of Fig. 1. Fig. 3 is a side elevation of a newly-constructed wheel, illustrating the application of the improvement thereto. Fig. 4 is a transverse section on the line 4 4 of Fig. 3, and Fig. 5 is a detail perspective view of one member of the tire-tightener.

In carrying out the invention the tightener is preferably made of metal and is to be applied between the felly A and the tire B, and while the opposing faces of the tire and felly may be straight the upper surface of the felly is preferably more or less convexed, as is likewise the under face of the tire, as is particularly shown in Fig. 2. The tire-tightening device may be made of such length as to completely encircle the wheel, as shown in Fig. 3, or it may be made in sections, as shown in Fig. 1, the sectional tightener being particularly adapted for the repair of wheels upon which the tire has become loosened, while the continuous form of the device is especially applicable to the construction of new wheels in the matter of placing a tire thereon.

In any event, whether the device be continuous or sectional, the tightening device comprises two members C and D, both of the said members being of a wedge shape, the inclination of their opposing or contacting faces being such that when the two sections are brought together, or placed one upon the other, they will represent the cross-section of a band the upper and lower faces whereof conform to the formation of the inner surface of the tire and the outer face of the felly. To that end the under face of the section D will be concaved, as shown at 10 in Fig. 2, when the face of the felly with which the tightener is to engage is convexed, while the upper face of the section C will be provided with a concavity 11 to fit closely against the convexed under face of the tire when the tire is of this formation. When, however, the tire and felly are flat, the outer ends of the tightening members will have their wedge shape, but their outer ends or edges will be more or less enlarged or swelled.

The upper face of the tightening-section D, which is the lower section, may be provided with an inclined surface 12, which extends from a shoulder 13 at the outer end of the section downward to a point near the center of the section, where it meets a second shoulder 14, and from this shoulder 14 the upper surface 15 of the said lower section D is inclined downward, the inclination terminating at the inner end of the section. The under face of the upper tightening-section C is then of a corresponding formation to the upper face of the lower section D, being formed with an end shoulder $13^a$, an inclined surface $12^a$, extending from the said shoulder to a central shoulder $14^a$, and a second inclined surface $15^a$, which extends from the intermediate shoulder $14^a$ to the inner end of the aforesaid upper section.

The thin end of the lower section D engages with the outer shoulder $13^a$ of the upper section, while a corresponding end of the upper section C will engage with the shoulder 13 of the lower section, as shown in Figs. 2 and 4, the sections C and D being driven between the felly and the tire from opposite sides of the wheel.

Under this construction it is obvious that any space that may exist between the tire and the felly of a wheel may be expeditiously and conveniently taken up and the tire made to maintain its circular form and be supported solidly on the felly without in the least injuring the latter, and that when a new wheel is being made, instead of shrinking the tire on the felly, the sections C and D, being continuous, may be introduced between the felly and the tire in a manner to hold the latter snugly and securely to the former. When the two sections C and D of the tightener are in place, the intermediate shoulders 14 and 14$^a$ will be in contact and corresponding inclined faces will be in engagement.

Having thus described my invention, I claim as new and desire to secure by Letters Patent—

1. A tire-tightener constructed in two wedge-shaped sections arranged to be passed one over the other, the thinner end of one section engaging with a stop at the thicker end of the opposing section, each section being provided with a stop intermediate of its ends, the stop of one section being on its under face and the stop on the other section being upon its upper face, the intermediate stops of the two sections being in engagement when the thinner ends of the two sections have found a bearing, as and for the purpose specified.

2. A tire-tightener, consisting of two sections of wedge construction, the opposing faces of the two sections being of like formation, namely, being provided with a shoulder at their thicker or outer ends, an intermediate shoulder, and inclined surfaces between the two shoulders and the intermediate shoulder and the thinner ends of the sections, the outer face of the upper section having a concavity, a concavity being also formed on the under face of the lower section of the tightener, as and for the purpose specified.

3. A tire-tightener, comprising the two wedge-shaped sections of predetermined lengths, and arranged to be fitted together between the tire and felly of a wheel to take up slack between the same, each section being formed with a thick and a thin side edge and an inclined face having the continuity of its incline broken by a shoulder adjacent the thick edge and a second shoulder half-way between the edges, the sections thus formed being arranged with such faces opposing, so that the intermediate shoulders will engage and the thin edge of one section abut against the shoulder adjacent the thick edge of the opposing section, as and for the purpose set forth.

ROBERT N. GARRETT.

Witnesses:
S. H. BOWERS,
G. D. ELLINGTON.